United States Patent
Bohrer et al.

(10) Patent No.: US 7,009,995 B1
(45) Date of Patent: Mar. 7, 2006

(54) METHOD AND A DEVICE FOR COMMUNICATION AMONG EQUAL-ACCESS STATIONS OF A RING-SHAPED SERIAL FIBER-OPTIC BUS

(75) Inventors: Wolfgang Bohrer, Frensdorf (DE); Walter Möller-Nehring, Erlangen (DE); Klaus-Dieter Renner, Nürnberg (DE); Rudolf Seidl, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,226

(22) PCT Filed: Jan. 18, 1999

(86) PCT No.: PCT/DE99/00098

§ 371 (c)(1),
(2), (4) Date: Oct. 11, 2000

(87) PCT Pub. No.: WO99/39463

PCT Pub. Date: Aug. 5, 1999

(30) Foreign Application Priority Data

Jan. 30, 1998 (DE) ............................... 198 03 686

(51) Int. Cl.
*H04L 12/43* (2006.01)
(52) U.S. Cl. ....................................... 370/460; 370/461
(58) Field of Classification Search ................ 370/389, 370/458, 474, 489, 460, 447, 449, 451, 452, 370/453, 461, 462

See application file for complete search history.

(56) References Cited

U.S. PATENT DOCUMENTS

| 4,845,709 A | * | 7/1989 | Matsumoto et al. ......... 370/452 |
| 4,847,613 A | * | 7/1989 | Sakurai et al. .......... 340/825.21 |
| 4,982,185 A | * | 1/1991 | Holmberg et al. ...... 340/825.21 |
| 5,687,316 A | * | 11/1997 | Graziano et al. ........... 709/250 |
| 5,941,966 A | * | 8/1999 | Gotze et al. ................. 710/105 |

FOREIGN PATENT DOCUMENTS

| DE | 196 26 287 | 2/1997 |
| EP | 0 504 907 A2 | 9/1992 |
| EP | 0 504 907 A3 | 9/1992 |

OTHER PUBLICATIONS

Heimbold, et al., "Digitale Kommunikation im Sensor—Aktuator-Bereich", Elektrie, vol. 46, No. 12, Jan. 1, 1992, pp. 528-532.

(Continued)

*Primary Examiner*—Kwang Bin Yao
(74) *Attorney, Agent, or Firm*—Staas & Halsey LLP

(57) ABSTRACT

A method is described for communication among equal-access stations of a ring-shaped, serial fiber-optic bus and to a device for carrying out this communications method. One station, during a bus cycle, generates container messages in a strictly time-cyclical manner, addresses them, and provides them to the serial bus, and it transmits a synchronization message at the end of the bus cycle time, each station writing its data into container messages that are addressed to it, and each station, depending on its read authorization, reading the container messages of the serial bus, all the data that have been read in the stations being imported with the assistance of the synchronization message. Thus, equal-access stations of a ring-shaped, serial fiber-optic bus can exchange data, in direct-access, extremely quickly and in a strictly time-cyclical manner.

9 Claims, 10 Drawing Sheets

OTHER PUBLICATIONS

Kiel et al., "Einchip-Controller für das SERCOS-Interface/Integrierte Echtzeit-Kommunikation für die MSR-Technik", Electronik, vol. 41, No. 6, Mar. 17, 1992, pp. 50, 55-59.

"Controller Area Network—A Serial Bus System Not Only for Motor Vehicles", International Association CAN in Automation (CiA) e.V.

Gick et al., "Communication in Drive Systems", Etz., vol. 112 (1991), Issue 17, pp. 906-916.

"How 'Peer-To-Peer' Aids Drive Technology", Engineering and Automation, vol. 16 (1994), Nos. 3-4, p. 48.

* cited by examiner

| Transmit | Leading Drive 1 | Following Drive 2 | Following Drive 3 |
|---|---|---|---|
| Leading Drive 1 | | STW_2 $s_{soll}$ $n_{soll}$ $a_{soll}$ | STW_3 $s_{soll}$ $n_{soll}$ $a_{soll}$ |
| Following Drive 2 | ZW_2 | | |
| Following Drive 3 | ZW_3 | | |

FIG 6

METHOD AND A DEVICE FOR COMMUNICATION AMONG EQUAL-ACCESS STATIONS OF A RING-SHAPED SERIAL FIBER-OPTIC BUS

FIELD OF THE INVENTION

The present invention relates to a method for communication among equal-access stations of a ring-shaped, serial fiber-optic bus and a device for carrying out this communications method.

BACKGROUND INFORMATION

A serial bus system is known for networking "intelligent" input/output units as well as sensors and actuators within an installation or machine. This serial bus system is called Controller Area Network (CAN) and is currently used not only in automobiles but also in industrial automation, for example in textile machines, packing machines, machines for manufacturing and distributing paper, and in medical technology. The serial bus is composed of a two-wire line, each of whose ends is provided with a bus terminal resistor.

CAN is a serial bus system that is multi-master capable, i.e., a plurality of CAN nodes can simultaneously request the bus. In CAN data transmission, according to the publication "Controller Area Network—a Serial Bus System Not Only for Motor Vehicles" of the International Association "CAN in Automation (CiA) e.V.," no stations on the bus are addressed, but rather the content of the message is designated by a network-wide unambiguous identifier. In addition to recognizing the contents, the identifier also establishes the priorities of the message. The priorities are issued in the system design through corresponding binary values and are not dynamically changeable. The identifier having the lowest binary number has the highest priority. Conflict in bus access is resolved using bit-by-bit arbitration regarding the respective identifiers, in that each station, bit for bit, observes the bus level. In this competition among stations, all of the "losers" automatically become receivers of the message having the highest priority and only make the attempt once again to transmit when the bus becomes free. Upon the acceptance check occurring all receiver stations in the CAN network, after correctly receiving the message based on the identifier, determine whether the data received are relevant for it or not (selecting). If the data have meaning for the receiver stations, then they are further processed (acceptance), but otherwise they are simply ignored. The length of the information to be transmitted is relatively short. Eight bytes of useful data can be transmitted per message. Longer data blocks can be transmitted through segmenting. The maximum transmission speed is 1 MBit/s. This value applies to a bus system having an extension of up to 40 m. For distances up to 500 m, a transmission speed of 125 kBit/s is possible, and at transmission lengths of up to 1 km, a value of only 50 kBit/s is permissible. The number of users in one CAN bus system is theoretically limited by the number of available identifiers (2032 in standard format and $0.5 \cdot 10^9$ in expanded format). Therefore, CAN permits the realization of need-dependent bus access, proceeding, on the basis of the bit-by-bit arbitration, in a non-destructive manner through message priority. A synchronization mechanism is not supported by the CAN and the data transmission speed is too low for a process in which a plurality of sequences of motions proceed synchronously, one after the other.

One digital serial field bus system that supports a synchronization mechanism is the SERCOS interface (Serial Real Time Communication System). This SERCOS interface is a digital, serial communications system between control units and drive systems or input/output modules, and it is presented in greater detail in the article, "Communication in Drive Systems," by Berthold Gick, Peter Mutschler, and Stephan Schultze, published in the German publication "etz", Vol. 112 (1991), Issue 17, pp. 906–916.

A SERCOS interface specifies a rigidly hierarchical communication having data in the form of data blocks, the so-called messages, which are exchanged in temporally constant cycles between a control unit and a plurality of substations. Direct communication between the substations does not take place. The SERCOS interface makes use of the ring topology, there being present as users for each ring a control unit, also termed master, and a plurality of substations, also termed slaves. The physical layer of a transmission link is composed of optical point-to-point connections. The optical transmission takes place in a directed manner, the elements of the transmission link being electro-optical converters, fiber optics, and opto-electrical converters. The transmission rate is 2 MBit/s, 4 MBit/s, or 8 MBit/s. The length of each transmission segment in plastic optical fibers can be as much as 60 m, and in the glass optical fiber up to 250 m. The maximum number of users for each fiber-optic ring is 254. In addition, repeat amplifiers are arranged in the slaves so that signal distortions arising as a result of the optical transmission cannot accumulate. The active signal conditioning and clock-pulse regeneration is achieved with the assistance of phase-locking loops. By using fillers and bit stuffing, it is assured that a sufficient quantity of signal edges is contained in the data stream. As a result, it is made possible for the phase-locking loops always to remain "locked in place," i.e., bit-synchronous.

Communication in the SERCOS interface is cyclical in operation, in the form of a master-slave communication having a cycle time that is selected during initialization. The master, in an independent transmitter signal element timing, either transmits messages or supplies filler to the ring. The slaves relay either their re-generated input signals to the next users (repeater function), or they transmit their own message. The master does not relay its input signal. For this reason, direct lateral (internode) communication between the individual slaves is not possible, and the ring can therefore be viewed as open at the master.

Each message begins and ends with a message boundary and has an address field, a data field, and a check sum. Messages that are transmitted by the slaves are source-addressed, i.e., the content of the address field indicates the transmitting station. Messages that the master transmits are destination-addressed. In the data field are the data to be transmitted. The length of the individual data fields of different messages is fixed during initialization and is then maintained at a constant value.

The communications cycle of the SERCOS interface is subdivided into five phases. The cycle begins with a master synchronization message, which functions to stipulate (input) the communications phase and the time reference. This is followed by the drive messages (source-addressed), which are transmitted by the individual slaves. After all the drive messages are present at the master, it transmits to all slaves a master data message. In addition, each slave, from the initialization time points, knows T3 and T4 within one cycle. At time point T3, system-wide, all data (setpoint values) are simultaneously released, and at time point T4, system-wide, all measuring values are simultaneously scanned. Immediately after the conclusion of the cycle time, the master begins the next cycle with the master synchronization message. Therefore, a SERCOS interface has the following synchronization types: bit synchronicity, synchronization of the communication, and the synchronization of data processing in the slaves.

Using this SERCOS interface, no rapid, direct-access communication that is also simple can be carried out among equal-access stations.

In the article, "How 'Peer-To-Peer' Aids Drive Technology," published in the German publication "Engineering and Automation," Vol. 16 (1994), Nos. 3–4, p. 48, a possibility is presented in which, within one multi-motor interconnection, signals are transmitted from drive unit to drive unit. Peer- to-peer connection denotes "connection between equal-access partners." In this peer-to-peer connection, one and the same drive unit can be both master (setpoint value source) as well as slave (setpoint value acceptor). The peer-to-peer connection for each drive unit is composed of a receiving and a transmitting connection and of a two-wire line. On the basis of a peer-to-peer connection, an autonomous setpoint value cascade can be constructed, which is simple to configure and to place in operation. The transmission rate is up to 187.5 kBit/s, and it can be increased to up to 16 control signals. In this peer-to-peer connection, the expense for constructing a new communications sequence is quite high, since new two- wire lines must be laid.

SUMMARY

An object of the present invention is to provide a method for communication among equal-access stations of a ring-shaped, serial fiber-optic bus, in which the aforementioned disadvantages no longer obtain.

In the communications method according to the present invention, from the equal-access stations on the ring-shaped, serial fiber-optic bus, one station is parametrized as the dispatcher and the other stations as transceivers. The dispatcher station, during each bus cycle, generates strictly time-cyclical container messages, addresses them, and supplies them to the bus. As the end message of each single bus cycle, this dispatcher station transmits a synchronization message. Each transceiver station writes its data into the container message addressed to it. Therefore, these written-in container messages are source-addressed. In addition, each transceiver station, as a function of its read authorization, can read the data of the written-in container messages on the serial bus. From the synchronization message that has been read, each station on the bus generates an interrupt, which, as a function of the position of the stations, is time-delayed on the bus such that all interrupts are output time-synchronously. Upon the output of these interrupts, all data that have been read are further processed.

As result of the fact that, during each bus cycle, sequentially arranged messages are provided to the bus, a bit stream is always present on the bus, so that the stations on the bus are operated in a bit-oriented manner. The time between two synchronization messages is the bus cycle time of the ring-shaped, serial fiber-optic bus and, at the same time, corresponds to the common system clock for the synchronization of all connected stations. This synchronization message is generated so as to be time-equidistant and jitter-free. Therefore, one of the equal-access stations also functions as the clock generator, and the other stations file their data, in each case, in the container messages assigned to them and thus make available their data for reading to all other stations on the serial bus. Since each station, as result of parametrizing, knows which source-addressed data may be read, every direct-access communication among equal-access stations, as result of parametrizing, can be set up without having to modify the hardware of the fiber-optic bus. In order that the communication on the ring-shaped, serial fiber-optic bus be maintained, one station must take on the function of the clock generator. Otherwise, no other means are required which control the communication among the equal-access stations on this bus.

BRIEF DESCRIPTION OF THE DRAWINGS

FIG. 6 depicts the appropriate communications table of the configuration example according to FIG. 5 and FIGS. 7–10 illustrate the different addressing mechanisms of the configuration example.

DETAILED DESCRIPTIONS

Figure 1:
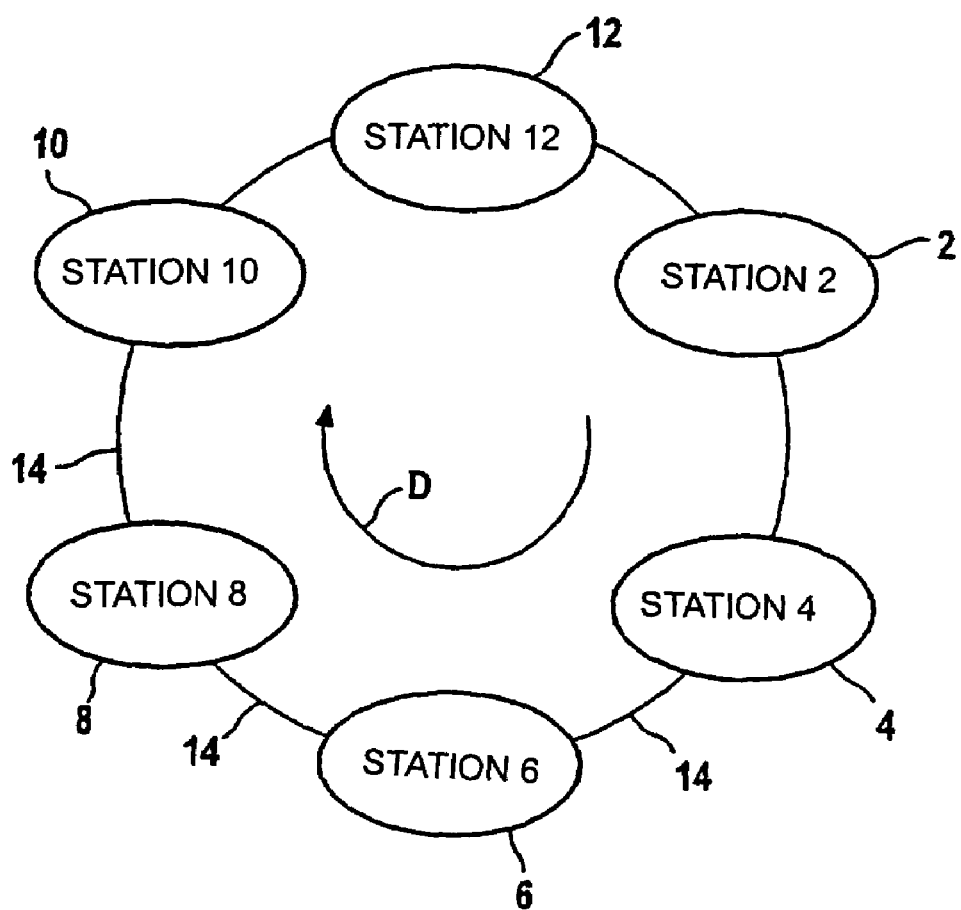
FIG. 1 depicts a bus topology.

In FIG. 1, a bus topology according to an example embodiment of the present invention is represented, on the basis of which a plurality of equal access stations 2 through 12 can communicate with each other. Individual stations 2 through 12 are each connected one to another using an optical fiber 14 as transmission medium. The data direction on this ring-shaped, serial fiber-optic bus is directionally determined and is illustrated by arrow D. As transmission medium, glass optical fibers or plastic optical fibers can be used. In order for the method according to the present invention for communication among equal-access stations 2 through 12 of a ring-shaped, serial fiber-optic bus to be carried out, one station 2 is parametrized as dispatcher and other stations 4 through 12 as transceivers. Each station 2 through 12 on the fiber-optic bus acts as a signal amplifier. Therefore, when plastic optical fibers are used as the transmission medium, a maximum of 40 m, and when glass optical fibers are used as the transmission medium a maximum of 300 m can be the distance between stations 2 through 12. The maximum number of users on the ring-shaped, serial fiber-optic bus in the example embodiment is 201.

Dispatcher station 2 has the function of feeder and is the clock generator of this bus system. The communications controller is stored, as a task table in a read-write memory 16 of dispatcher station 2. In this task table, the number of messages this dispatcher station 2 has to send in one bus cycle, also designated as bus cycle time is determined. For this purpose, for every active user, i.e., equal-access stations 2 through 12 on the serial bus, there are determined in this task table, inter alia, an address and a channel number as subaddress. In addition, the addresses of so-called blank messages and of special messages are also stored in this task table. Among these special messages are, inter alia, the synchronization message and the so-called NOP messages (No operation). On the basis of the synchronization message, all stations 2 through 12 of this ring-shaped bus are requested to further process the data that have been read. The blank messages and the NOP messages function as filler messages, so that within each bus cycle time, messages are continuously circulating on the ring-shaped, serial fiber-optic bus. In this manner, stations 2 through 12 are operated on the bus in a bit-synchronous manner. The synchronization message is always the last entry in the task table and is therefore always transmitted at the end of the bus cycle time. The task table is limited to a maximum of 1024 entries, i.e., a maximum of 1024 messages can be transmitted in one bus cycle from dispatcher station 2. For each user, eight subaddresses can be used. If, therefore, for all the active users of the ring-shaped, serial fiber-optic bus all eight subaddresses are used, then a maximum of 128 users can be connected to the bus.

Dispatcher station 2 executes its task table, by linking, in transmission sequence, every address to a container message and outputting it to the serial bus. After the last entry of this task table has been read out, the processing of the entries of this task table is begun from the beginning, without delay. The container messages are generated in a strictly time-cyclical manner. Each transceiver station 4 through 12 receives the messages initiated by dispatcher station 2 and can read the data of the messages, in accordance with its read authorization, and can overwrite using its own data, or store them. Dispatcher station 2, just as each transceiver station 4 through 12, can read the data of the messages, in accordance with its read authorization, and can overwrite using its own data, or store them. In addition, each transceiver station 4 through 12 relays the received messages regardless of whether the data have been read or have been overwritten using new data, or have been stored in them. No stations 2 through 12 on the ring-shaped, serial fiber-optic bus which are parametrized as transceivers can autonomously maintain the data traffic on the ring bus. This is exclusively the task of dispatcher station 2.

Figure 2:
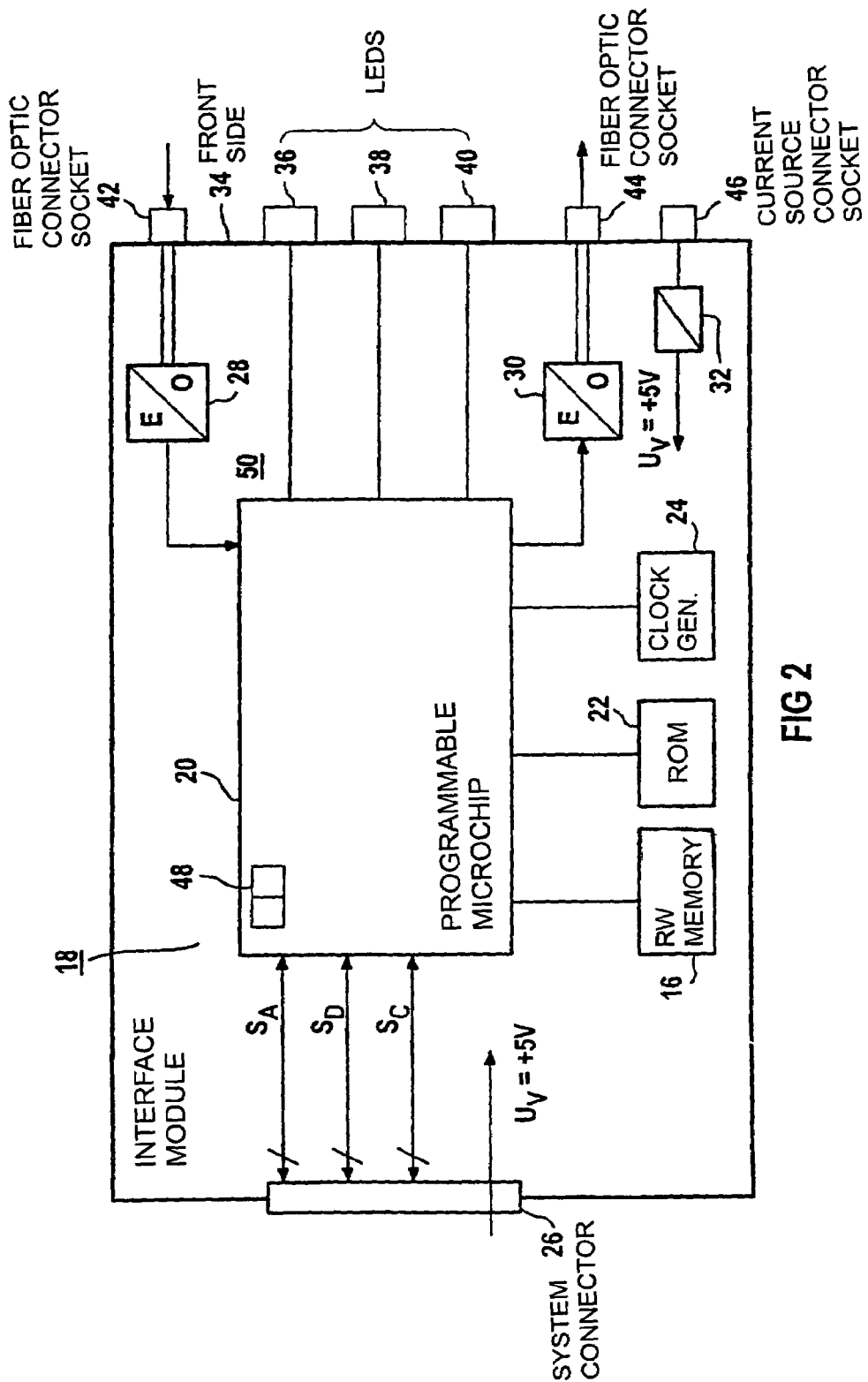
FIG. 2 depicts in greater detail a block diagram of an interface assembly of the bus system according to the present inventions.

In FIG. 2, a block diagram is schematically depicted of an example interface module 18, which is arranged in each station 2 through 12 of the ring bus in accordance with FIG. 1. This interface module 18 has a programmable microchip 20 having an associated erasable read-only memory 22, a read-write memory 16, a clock generator 24, a system connector 26, an opto-electrical and an electro-optical converter 28 and 30, and a voltage source 32. In addition, a front side 34 of this interface module 18 is provided with a plurality of light-emitting diodes 36, 38, and 40 for the status display of this interface module 18, two fiber-optic connector sockets 42 and 44, which are also designated as bus connector sockets 42 and 44, and a current source connector socket 46. Bus connector socket 42 or 44 receives an optical fiber 14 of the serial ring bus and is linked to opto-electrical or electro-optical converter 28 or 30. This converter 28 or 30 is connected in an electrically conductive manner, on the output or the input side, to a terminal of programmable microchip 20. Similarly, erasable read-only memory 22, read-write memory 16, and clock generator 24 are also linked to this programmable microchip 20. As voltage source 32, a DC/DC voltage transformer is provided, which transforms an external DC voltage of, for example, 24 V into an internal DC voltage $U_v$ of, for example, 5 V. It can also be seen from this representation that this DC voltage $U_V$ is also supplied by one station 2 through 12, to which this interface module 18 is plugged in. The exchange of signals $S_A$ (addresses), $S_D$ (data), and $S_C$ (control signals, interrupts), as well as of DC voltage $U_v$ is brought about using system connector 26.

If, for example, voltage $U_v$ of one of stations 2 through 12 fails, the performance capacity of interface module 18 and thus the performance capacity of the ring-shaped, serial fiber-optic bus can be maintained by an external voltage source connected to interface module 18. Programmable microchip 20 has a device 48 for parametrizing interface module 18 as dispatcher or as transceiver. As programmable microchip 20, a programmable gate array is provided, in particular a Field-Programmable Gate Array (FPGA), whose program is stored in erasable read-only memory 22. For executing this program, a clock pulse is required which is supplied by clock generator 24, in particular an oscillator. In read-write memory 16, either a task table or transmitting and receiving data are stored.

If this interface module 18 is parametrized as dispatcher using device 48, then a task table must be created in read-write memory 16. If this interface module 18 is parametrized as transceiver using device 48, then in read-write memory 16 transmitting and receiving data are stored during a bus cycle. In this read-write memory 16, the addresses of messages are stored which are to be read by this interface module 18.

As was already mentioned, front side 34 of interface module 18 has three light-emitting diodes 36, 38, and 40, which give information concerning the current operating state. If light-emitting diode 36 flashes, for example, green, then error-free useful-data traffic is taking place across the ring-shaped, serial fiber-optic bus. If light-emitting diode 38 flashes, for example, red, then interface module 18 is in operation. If light-emitting diode 40, flashes, for example, yellow, then the data exchange is functioning properly between this interface module 18 and the station to which this interface module 18 is plugged in. If one of these light-emitting diodes 36, 38, and 40 is inactive, then a fault is present.

Both converters 28 and 30, together with one part of programmable microchip 20, constitute a so-called interface circuit 50 of interface module 18. This interface circuit 50 is the interface of each interface module 18 to the ring bus. The function of this interface circuit 50 lies in converting the received message into electrical signals, scanning and regenerating the signals, as well as subsequently converting the electrical signal into a transmission message. Each interface circuit 50 influences to the same degree the time response (dynamic behavior) of the data transmission. That is, each received message is delayed by roughly 3 bit-times before it can again be transmitted on the bus. This delay is also termed processing (transmission) delay. This delay is caused, on the one hand, by converters 28 and 30 and, on the other hand, by the signal scanning and regeneration. At a fixed data transmission rate of, for example, 11 MBit/s, the 3 bit-times correspond to a time of 272 ns.

Figure 3:
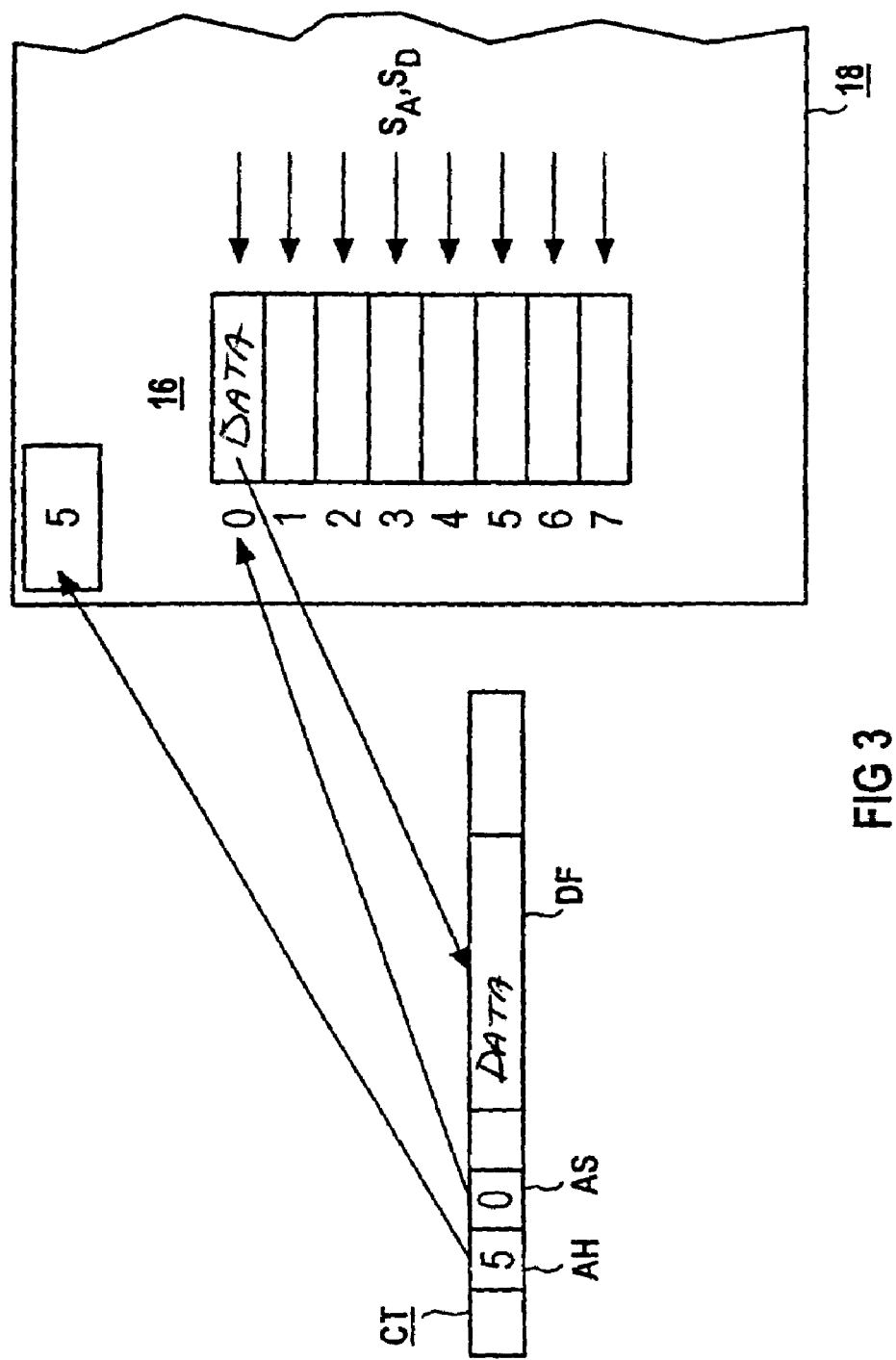
FIG. 3 depicts the "write" addressing mechanism.

In FIG. 3, the "write" addressing mechanism is illustrated. In this illustration, only one part of read-write memory 16 of interface module 18 is depicted. Dispatcher station 2 and each transceiver station 4 through 12 may write data only in container messages, which are assigned to them at their address. Each message CT, in the message heading, has an address AH and a channel number as subaddress AS. Each address AH has eight subaddresses, which are each 32 bits large. Therefore, each station 2 through 12 can transmit a maximum of 8×32 bit-data in eight messages CT, which have the same addresses AH and channel numbers of 0 through 7 as subaddresses AS.

In the depicted example of FIG. 3, the user on the ring bus having address 5, i.e., this user is a transceiver station 4 through 12, writes data from subaddress 0 into container message CT having address 5. If data are already stored in data field DF of this message 5/0, then they are overwritten in this write mechanism. The data written into data field DF of this container message CT have been written by the associated transceiver station into this read-write memory 16 using signals $S_A$ and $S_D$ via system connector 26 and programmable microchip 20. Therefore, this part of read-write memory 16 constitutes a transmission memory, in which process data such as setpoint values, actual values, control or status information are written. In the communications method according to the present invention, each station can write data into its associated container message CT. Therefore, each message CT is not destination-addressed, but rather source-addressed. In this manner, the communication among equal-access stations 2 through 12 on the serial ring bus is made simpler because each station 2 through 12, with respect to the transmission of a message CT, i.e., the writing of data, stores data only in container messages CT that bear its address.

Figure 4:
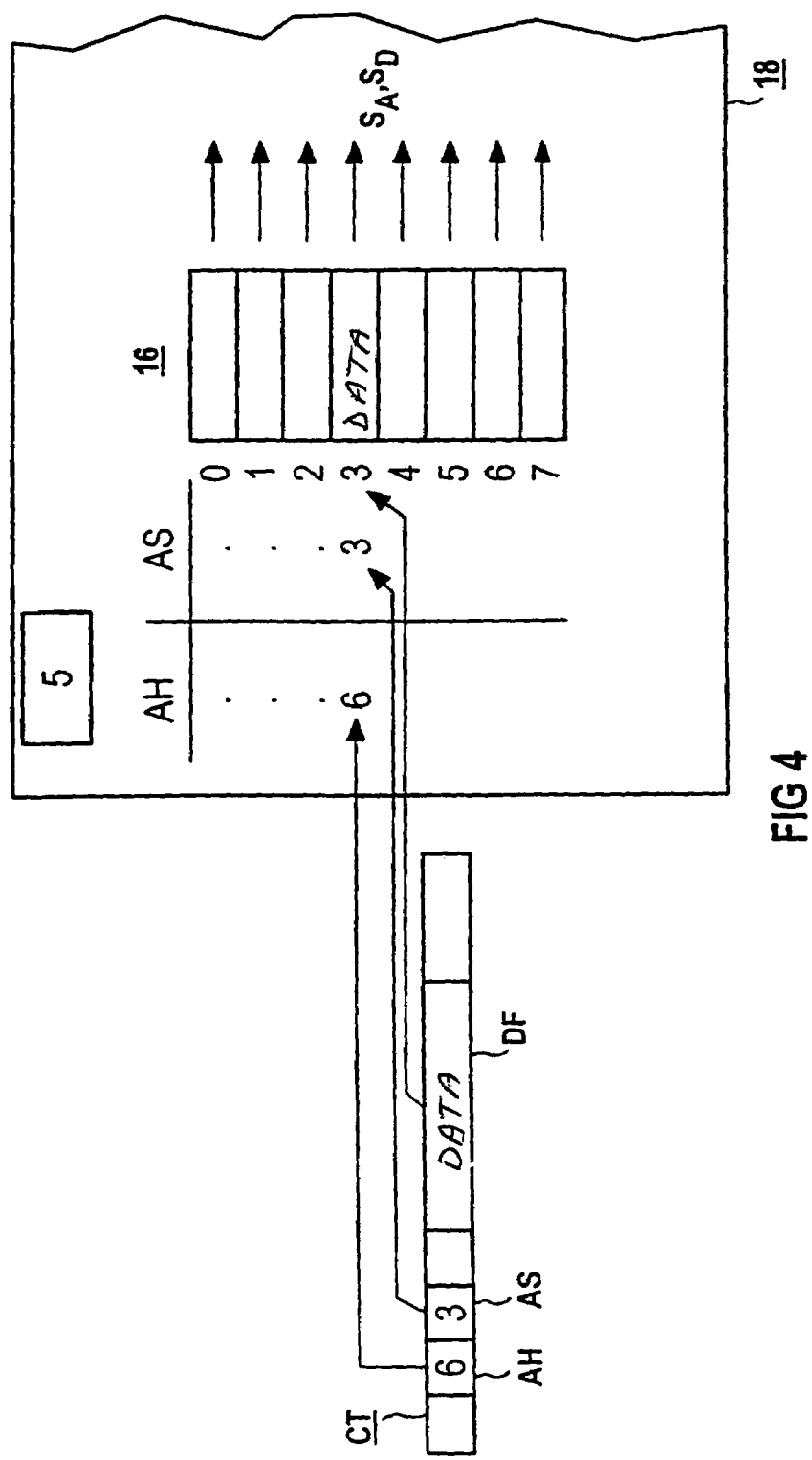
FIG. 4 represents the "read" addressing mechanisms.
Figure 5:
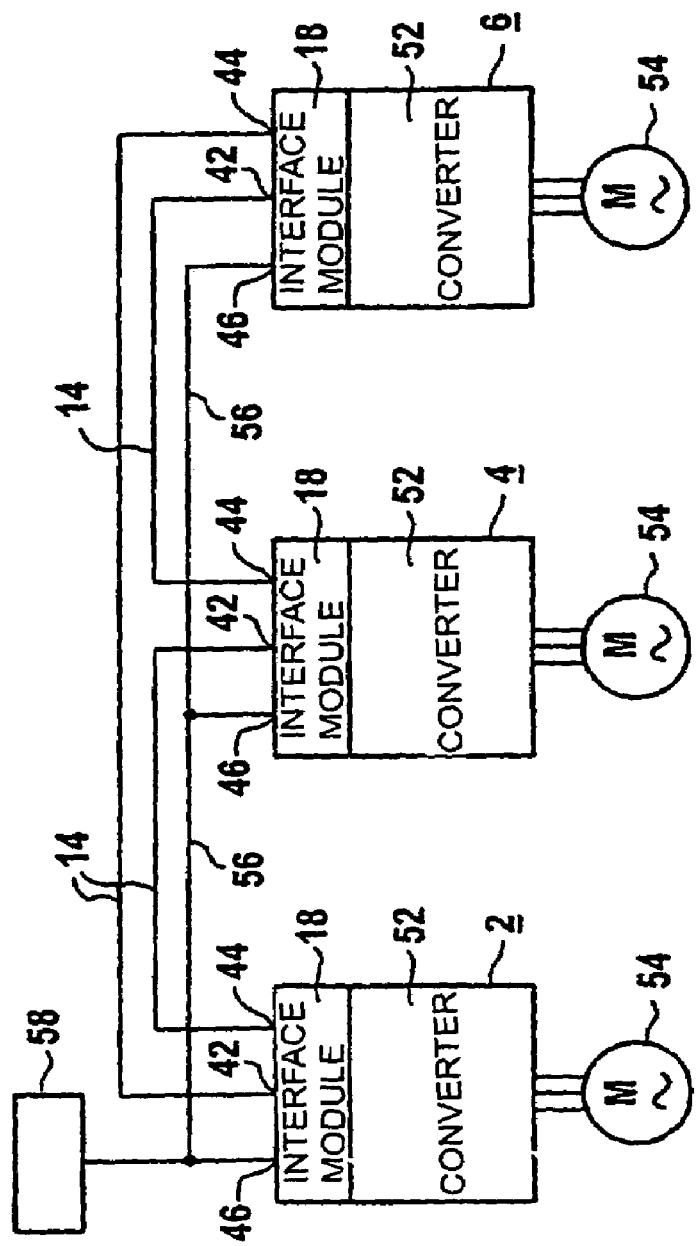
FIG. 5 depicts a configuration example for a peer-to-peer functionality.

In FIG. 4, the "write" addressing mechanism is illustrated. In this illustration, just as in the illustration according to FIG. 3, only one part of read-write memory 16 of interface module 18 is depicted. Dispatcher station 2 and each transceiver station 4 through 12, in direct-access, can read the data from every message CT on the ring bus (including their own messages). Which messages CT can ultimately be read, depends in each case on the read authorization of each station 2 through 12 of the serial ring bus, as parametrized in the initialization of an application. For this purpose, in dispatcher station 2 or in transceiver stations 4 through 12, addresses AH and subaddresses AS are, in each case, parametrized as a receiving message, whose data are to be read.

In the example depicted in FIG. 4, the user on the ring bus having address 5 reads data from data field DF of container message CT having address 5/3, i.e., this user writes the data into the data channel having channel number 3 of one part of read-write memory 16. This part of read-write memory 16 is therefore designated as the receiving memory. In order that this user having address 5 can read container message CT having address 6/3, this address 6/3 must be configured as a read address. It can be seen from this illustration that a further part of this read-write memory 16 is provided for the configuration of the read authorization of associated interface module 18. In this part of read-write memory 16 are entered the addresses of all messages CT to be read having address AH and subaddress AS.

Upon the transmission of the final entry in the task table, i.e., the synchronization message, in each station 2 through 12 of the ring bus, delay times for compensating for the running time delay, created by the signal transformation in each user, are compensated for in a time-delayed manner. For this calculation of an individual time delay, each station 2 through 12 knows the number of equal-access stations 2 through 12 on the ring bus and their associated location numbers. Upon the termination of each calculated time delay, in each case, an interrupt is available, by which stations 2 through 12 are time-synchronized. Using this interrupt, the data that have been read are imported from the receiving memory of read-write memory 16 of each interface module 18 into the respective associated station. Internal closed-loop control circuits of individual stations 2 through 12 on the serial ring bus can be synchronized to this strictly time-cyclical synchronization message.

On the basis of a configuration example for a peer-to-peer functionality in accordance with FIGS. 5 through 10, the method according to the present invention for communication among equal-access stations 2 through 14 of a ring-shaped, serial fiber-optic bus is explained in greater detail:

In the configuration example, three converter-fed motors, at a precise angle, are to run in a synchronized manner. Thus, on one ring-shaped, serial fiber-optic bus, three stations 2, 4, and 6 are connected with the assistance of their associated interface modules 18. Each station 2, 4, and 6 constitutes a variable-speed drive composed of a converter 52 and an AC motor 54. Interface modules 18 of three stations 2, 4, and 6 of the ring bus are connected to each other by optical fibers 4 such that station 2 has location number 1, station 4 location number 2, and station 6 location number 3. Each interface module 18 has communicated to it its location number and the number of stations 2, 4, and 6 on the serial ring bus. From these numbers, each interface module 18 calculates its individual delay time.

In this angle-precise, synchro control of three variable-speed drives, station 2 is declared as leading drive having an integrated virtual leading axis. The speed reference input variable for this interface module is prescribed through an analog entry or a system control unit.

The integrated virtual leading axis function generates a path, speed, and acceleration setpoint value, $S_{soll}$, $n_{soll}$, and $a_{soll}$ for stations 4 and 6, which constitute a following drive 2 and a following drive 3. In this configuration example, following drives 2 and 3 are also to be switched on and off by the leading drive. This means that each following drive receives an individual control word, STW.2 or STW.3. Conversely, the following drive is to transmit an individual status word, ZW.2 or ZW.3, to the leading drive. This results in a communications table, which is depicted in greater detail in FIG. 6

For the transmission of process data, interface modules 18 of the three stations 2, 4, and 6 must be parametrized as follows:

Interface module 18 in dispatcher station 2
(leading drive)
The following five process data must be transmitted:
STW.2=control word for station 4
STW.3=control word for station 6
$S_{soll}$=path setpoint value
$n_{soll}$=speed setpoint value
$a_{soll}$=acceleration setpoint value
Five messages, i.e., five channels, are required for this purpose.
Interface module 18 of transceiver station 4
(following drive 2)
A process datum is transmitted in Status word Zw.2 (write).
For this purpose, one message (=one channel) is required.
ZW.2=status word from station 4
Interface module 18 of transceiver station 6
(following drive 3)
A process datum is transmitted in status word ZW.3 (write).
For this purpose, one message (=one channel) is required.
ZW.3=status word from station 6.
For dispatcher station 2 as leading drive, the following parameter settings are significant:
Device 48 on interface module 18 of dispatcher station 2 is set at dispatcher. Thereupon, the channel number, which, in this configuration example, is 5, is communicated to interface module 18 of dispatcher station 2. Therefore, each user has available to it five messages for writing. Subsequently, the cycle time is entered as a parameter, which in this example is 1 ms. Since this cycle time cannot be reached on the basis of five messages, as many additional messages, so-called blank messages and NOP messages, are transmitted automatically until this cycle time is reached.

For the synchronization of the decentralized, lower-level closed-loop control circuits in converters 52 of stations 2, 4, and 6, the bus cycle time must have a defined relationship with respect to the time slices of the individual closed-loop controllers. For the time slices of converter 52, the following determination applies:

current control in time slice $T_0$
speed control in time slice $2 \cdot T_0$
position control in time slice $4 \cdot T_0$ Time slice $T_0$ is equal to the reciprocal value of the pulse frequency and is set in converter 52 by the selection of pulse frequency. Then, for the selection of the bus cycle time, the following applies:

Bus cycle time=n×the slowest time slice to be synchronized where n=1, 2, 3 . . .

In the configuration example, the position control loops of three stations 2, 4, and 8 are to be synchronized, as a result of which the bus cycle time is selected such that n times the time slice of the position control corresponds to it. At the conclusion of the parametrizing, transceiver station 2 (following drive 2) receives user address 1, and transceiver station 6 (following drive 3) receives user address 2.

Figure 7:
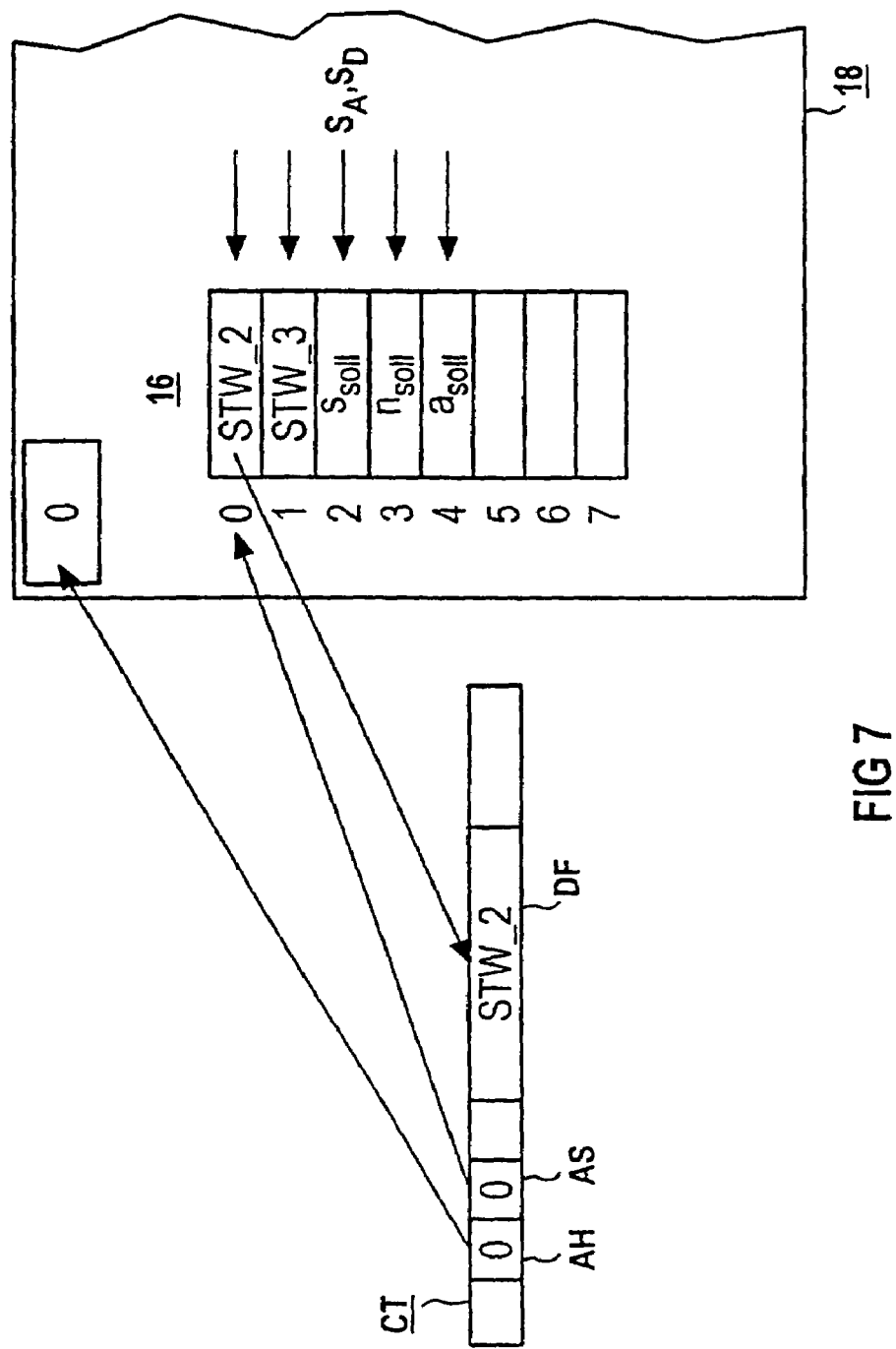

In FIG. 7, the "read" addressing mechanism of station 2 is illustrated. Subscriber address 0 indicates that this interface module 18 is parametrized as dispatcher. The data that are located in subaddresses 0 through 4 are written onto the bus one after the other using addresses 0/0 through 0/4

Figure 8:
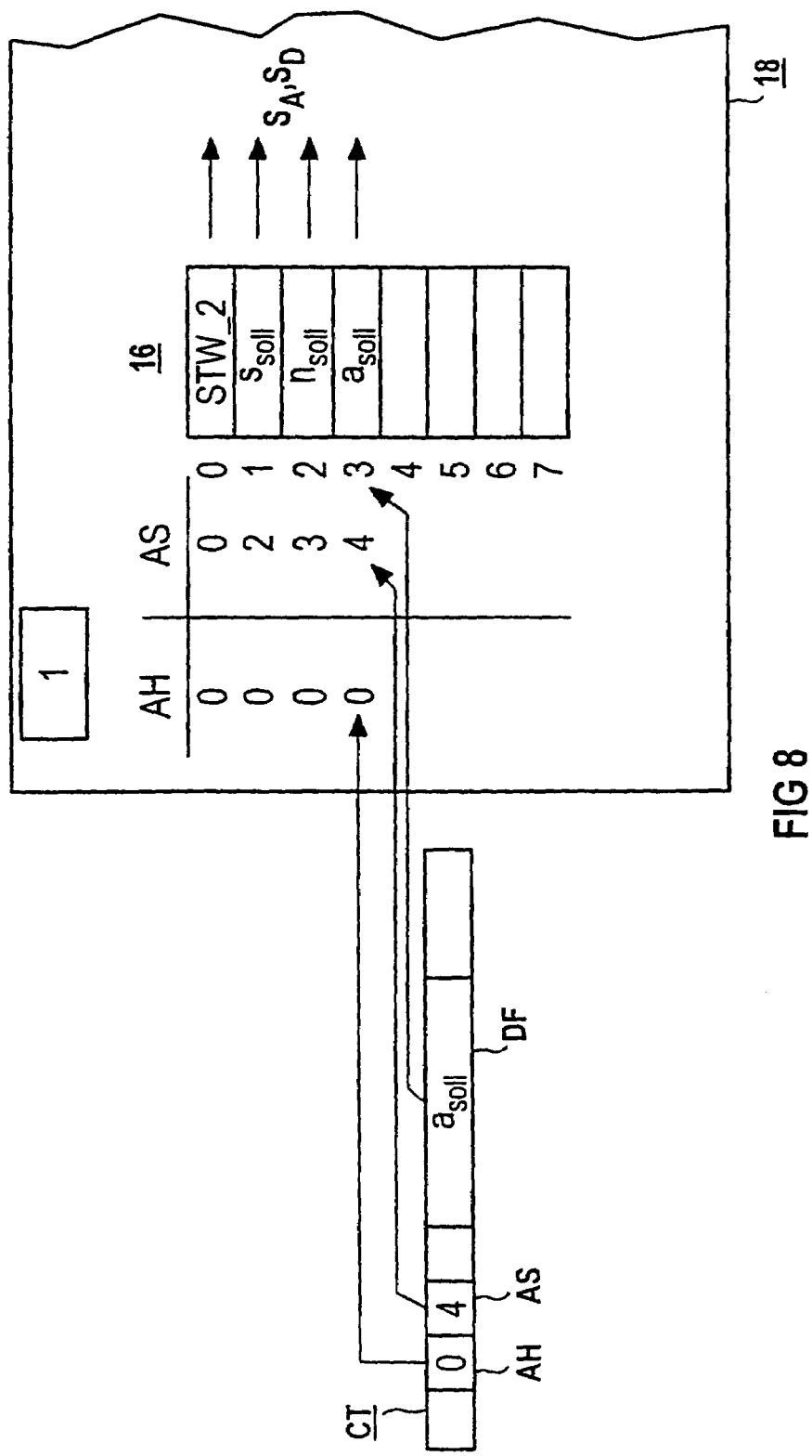

In FIG. 8, the "read" addressing mechanism of station 4 is illustrated. User address 1 indicates that this interface module 18 is parametrized as transceiver. In addition, in one part of read-write memory 16, the read authorization of this station 4 on the serial ring bus is stored in the form of a table. In this table are entered all message addresses, including their address AH and their subaddress AS, which are permitted to be read by this transceiver station 4. In reading these messages CT, the data, here acceleration setpoint value $a_{soll}$, of data field DF of container message CT are copied, in accordance with subaddress AS, into the corresponding data channel of the receiving memory of read-write memory 16. A comparison with container messages CT of dispatcher station 2 in accordance with FIG. 7 indicates that the message having address 0/1 may not be read by transceiver station 4, i.e., this message having address 0/1 is transmitted only with the assistance of interface circuit 50 of this interface module 18 to the next user of this serial ring bus.

Figure 9:
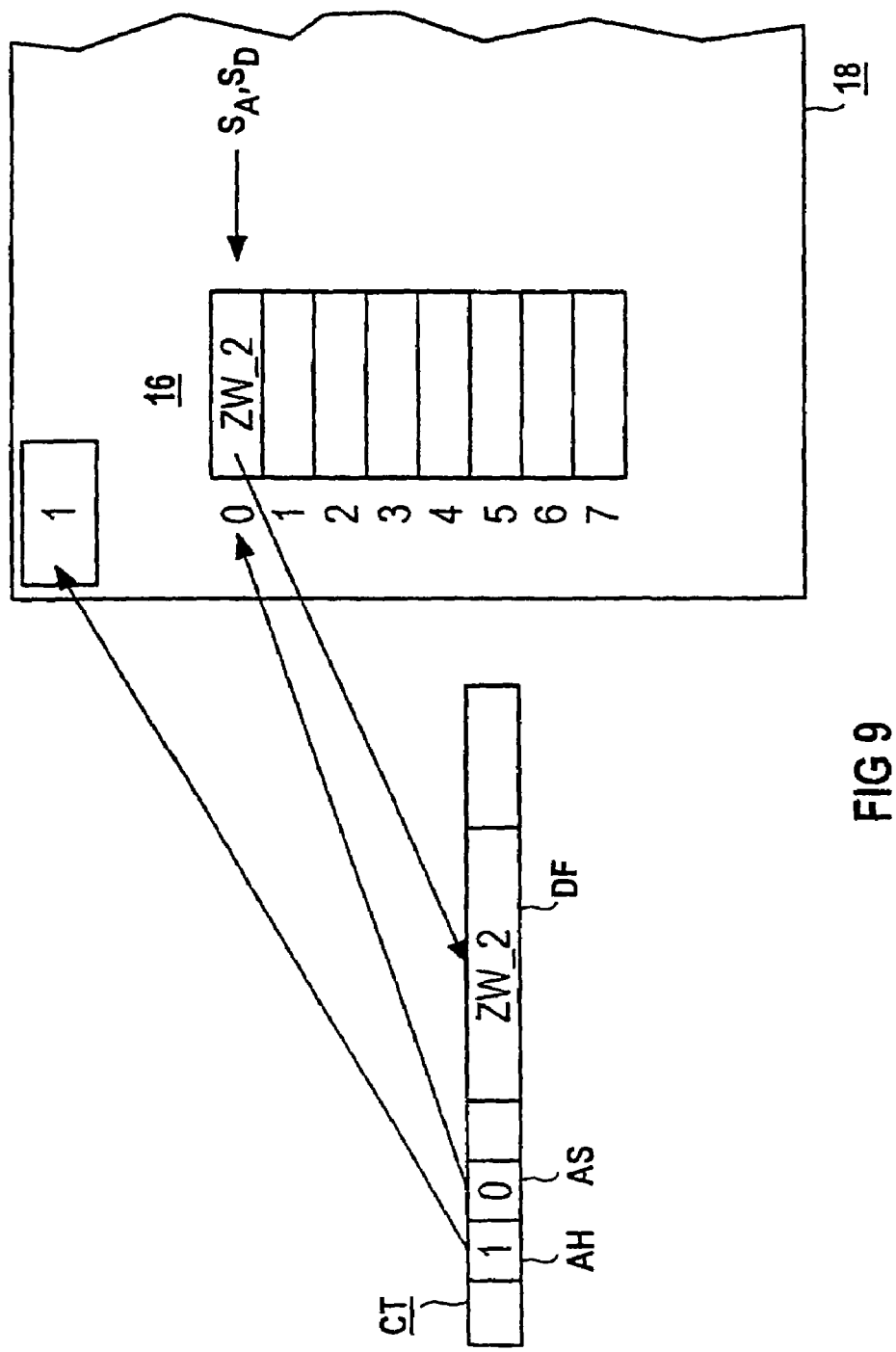
Figure 10:
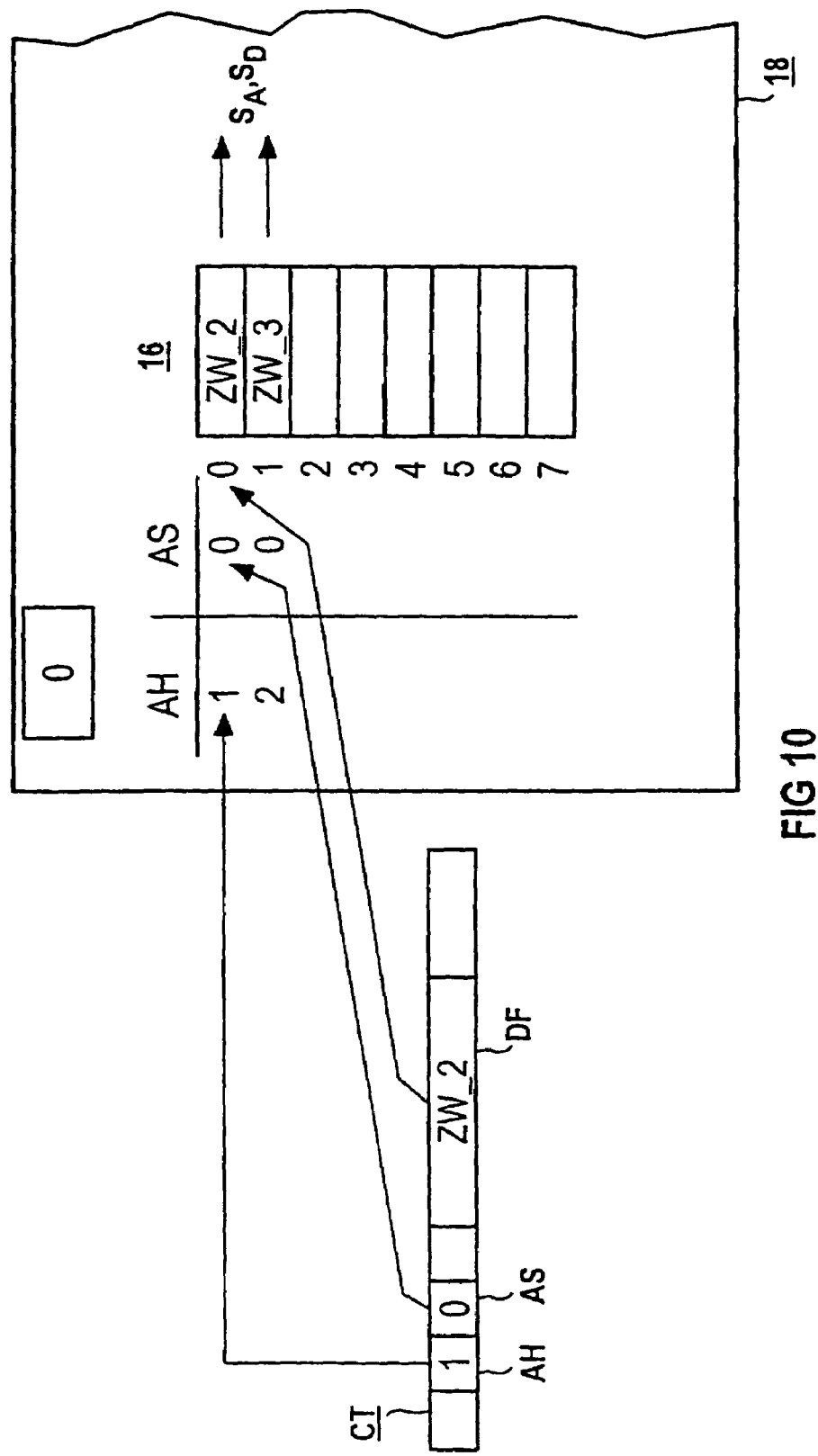

In FIG. 9, the "write" addressing mechanism of transceiver station 4 is depicted. In accordance therewith, this transceiver station 4, in a container message CT having address 1/0 of this transceiver station 4, writes its data, here status word ZW.2 of following drive 2, into corresponding data field DF. If this transceiver station 4 has to transmit up to eight data to the ring bus, dispatcher station 2, in accordance with a task table, would transmit a further seven container messages CT having user addresses 1/1–1/7, sequentially arranged on the ring bus.

Since the data (status word) of transceiver stations 4 and 6 (following drives 2 and 3) are to be transmitted to dispatcher station 2 (leading drive), this dispatcher station 2 must have a corresponding read authorization. That is, in a read authorization table of read-write memory 16 of interface module 18, the message addresses of stations 4 and 6 on the serial ring bus are entered, whose messages CT dispatcher station 2 is to read. Since the data of transceiver stations 4 and 6, in each case, are located in the first subaddress, user addresses 1/0 and 2/0 are stored in the read authorization table of dispatcher station 2.

In the initialization of this configuration example, in addition to the parameters of number of users, location number, and dispatcher or transceiver function, further parameter settings must be undertaken. Since this ring-shaped, serial fiber-optic bus has a constant transfer rate of, for example, 11 MBit/s and an overall length of each message CT is 70 bits inclusive of the 32 bits of data, therefore one message CT requires a transfer time of 6.36 µs. A bus cycle time is determined as a function of the time slices of the individual closed-loop control circuits of the users connected on the ring bus. It is assumed that in the configuration example, the bus cycle time is 1 ms. In addition, seven messages having user addresses 0/0 through 0/4, 1/0 and 2/0 and the synchronization message are transmitted. Since these eight messages do not reach the bus cycle time, as many additional messages, so-called blank messages, to non-address users are inserted until the cycle time of 1 ms is reached. Since the running time for one message is 70 bit-times, at a transfer rate of 11 MBit/s, 157 messages can be transmitted. These messages CT are transmitted without intervening pauses, one immediately after the other, as a result of which a strictly time-cyclical bus cycle is assured. If the bus cycle time is still not reached by the number of messages CT, the difference being smaller than the length of one message CT, then the temporal gap is filled with so-called NOP messages.

In this configuration example, the task table, which is stored in one part of read-write memory 16 of interface module 18 of dispatcher station 2, includes 157 messages, of which 7 are user messages having user addresses 0/0 through 0/4, 1/0, and 2/0, 159 are blank messages, and 1 is a synchronization message. These messages CT are listed in this sequence in the task table. As a result of the synchronization message transmitted at the end of the bus cycle time, in equal-access stations 2, 4, and 6, individual time delays are calculated such that at the same time in each station 2, 4, and 6, an interrupt is generated which assures that, in each case, the data that have been read from the receiving memory of read-write memory 16 of each interface module 18 are imported from corresponding converter 52 using signals $S_A$ and $S_D$.

On the basis of this method according to the present invention for communication among equal-access stations on a ring-shaped, serial fiber-optic bus, process data can be exchanged extremely rapidly, in a strictly time-cyclical manner among the equal-access stations, each station communicating only with the bus, due to the source addressing of the messages and the direct-access read authorization. That is, each equal-access station does not know the stations with which it communicates but rather knows only which messages may be read and which may be written in by it. In this manner, configuring a system is reduced to parametrizing each equal-access station of a serial bus system.

This communications method according to the present invention can also be applied in a conventional hierarchical bus structure. In a so-called master-slave bus structure, the dispatcher station is the superordinate control unit, for example, an automation system.

What is claimed is:

1. A method for communication among equal-access stations of a ring-shaped, serial fiber-optic bus, comprising:

during one bus cycle, a predetermined one of the stations generating strictly time-cyclical container messages, addressing the container messages, and supplying the container messages to the bus, the predetermined one of the stations supplying a synchronization message to the bus as an end message of the bus cycle;

each one of the stations writing respective data in the container messages addressed to the one of the stations;

each one of the stations reading data of written-in container messages on the serial bus as a function of a read authorization of the one of the stations;

each one of the stations communicating only with the bus, due to source addressing of the written respective data and each one of the stations having direct-access read authorization of the respective data written by each one of the stations;

each one of the stations reading the synchronization message and generating a respective interrupt as a function of the synchronization message, wherein depending on a respective position of each one of the stations, the respective interrupt being time delayed so that all of the respective interrupts are output in a time-synchronous manner; and further processing the read data when the respective interrupts are output.

2. The method according to claim 1, wherein the time delay is determined according to the following equation:
$t_{vz,n} = [N-(n-1)] \cdot 3B$ where N=number of users B=bit time
n=location number of the station.

3. The method according to claim 1, further comprising: continually providing to the serial bus addressed blank messages following a last addressed container message.

4. The method according to claim 3, further comprising: outputting special messages for filling up the bus cycle between the last generated addressed message and the synchronization message.

5. The method according to claim 4, wherein the addressing and supplying of the container messages is carried out in accordance with an increasing address part.

6. The method according to claim 5, wherein the addressing and supplying of the contain messages is carried out in accordance with an increasing subaddress part.

7. A device for providing communication among equal-access stations of a ring-shaped, serial fiber-optic bus, comprising:

a respective interface module at each of the stations; and two respective bus connector sockets at each of the stations, each respective interface module being connected to the serial bus via the two respective bus connector sockets;

wherein one of the stations is parameterized as a dispatcher station, and others of the stations being parameterized as transceiver stations, the dispatcher station including a list of all messages to be transmitted, and each of the transceiver stations having a read authorization wherein each respective interface module includes a programmable microchip having an associated erasable read-only memory, a read-write memory, and a clock generator, each respective interface module including a system connector, an opto-electrical and electro-optical converter, and a voltage source, each of the respective bus connector sockets being linked to the programmable microchip by the converter, the programmable microchip being connected to the system connector via signal lines;

wherein the programmable microchip is provided as a programmable gate array, and wherein the read-write memory has stored thereon a communications controller comprising a task table that includes a number of messages to be sent in a bus cycle by the dispatcher station, an address and channel number as a subaddress of each station, and addresses of blank messages and special messages to be used to fill up the bus cycle between the last generated addressed message and the synchronization message.

8. The device according to claim 7, wherein the interface module includes light-emitting diodes for status display.

9. A device for providing communication among equal-access stations of a ring-shaped, serial fiber-optic bus, comprising:

a respective interface module at each of the stations; and two respective bus connector sockets at each of the stations, each respective interface module being connected to the serial bus via the two respective bus connector sockets;

wherein one of the stations is parameterized as a dispatcher station, and others of the stations being parameterized as transceiver stations, the dispatcher station including a list of all messages to be transmitted, and each of the transceiver stations having a direct-access read authorization which allows reading of data written in the transmitted messages by each of the transceiver stations, and wherein the each interface module includes a read-write memory that has stored thereon a communications controller comprising a task table that includes a number of messages to be sent in a bus cycle by the dispatcher station, an address and channel number as a subaddress of each station, and addresses of blank messages and special messages to be used to fill up the bus cycle between the last generated addressed message and the synchronization message.

* * * * *